Feb. 16, 1971  A. V. WEBER  3,563,671
PUMP CONTROL
Filed Oct. 1, 1969  2 Sheets-Sheet 1
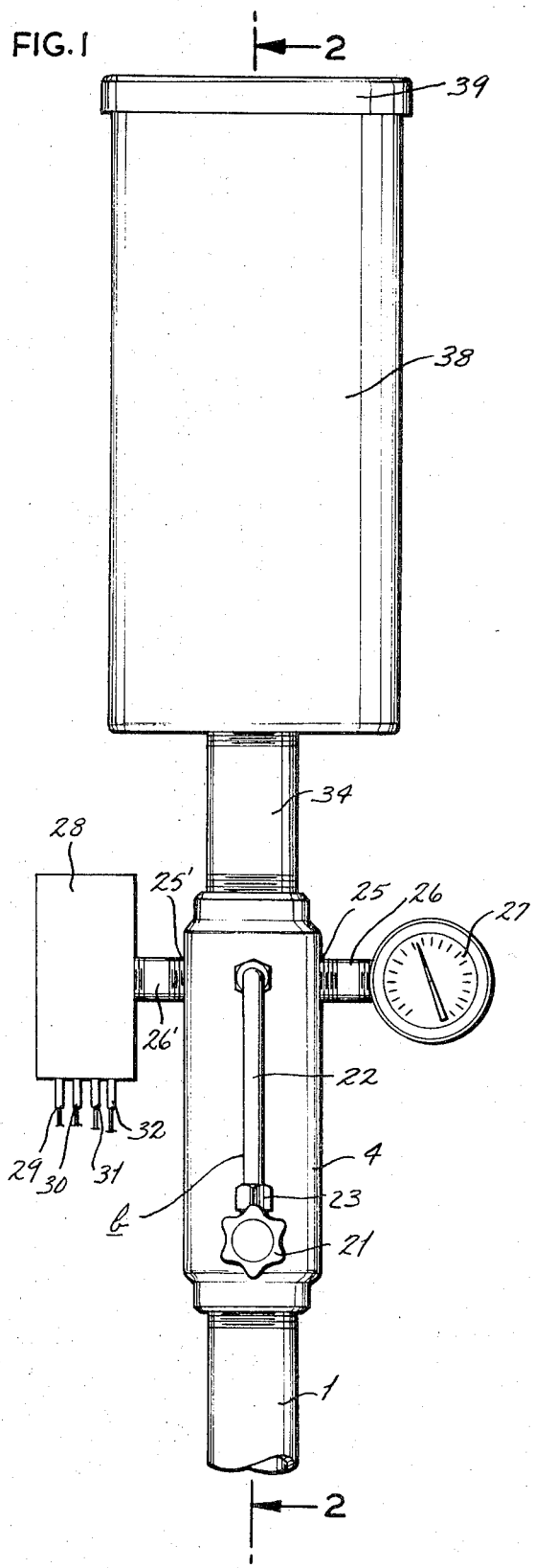
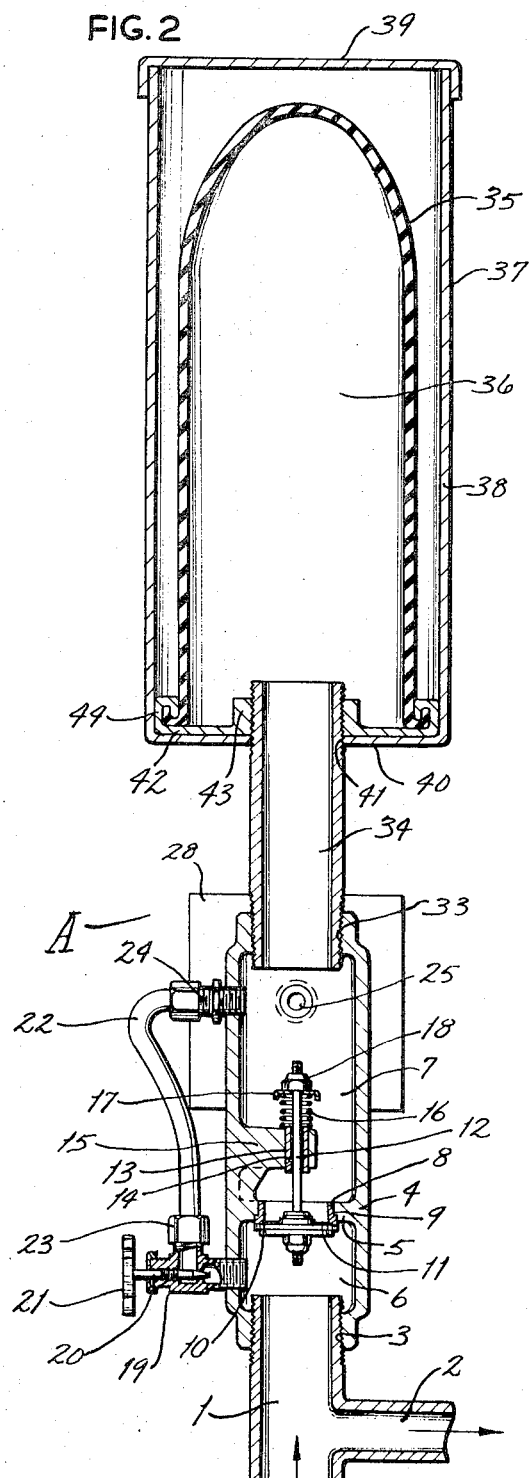
INVENTOR
ANTHONY V. WEBER
BY Ralph W. Kalish
ATTORNEY Feb. 16, 1971  A. V. WEBER  3,563,671
PUMP CONTROL
Filed Oct. 1, 1969  2 Sheets-Sheet 2
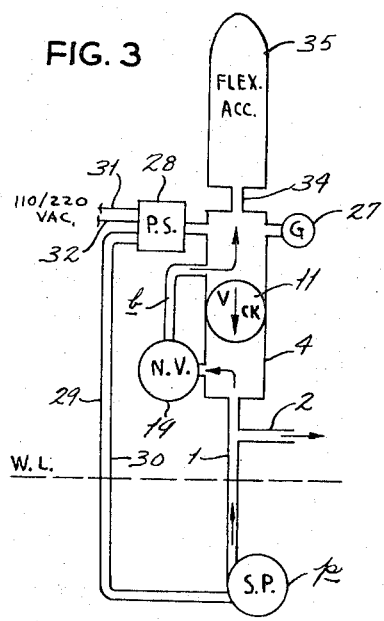
FIG. 3
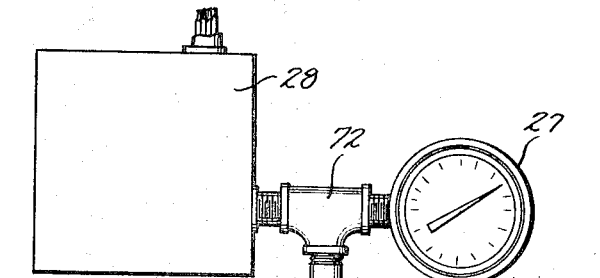
FIG. 4
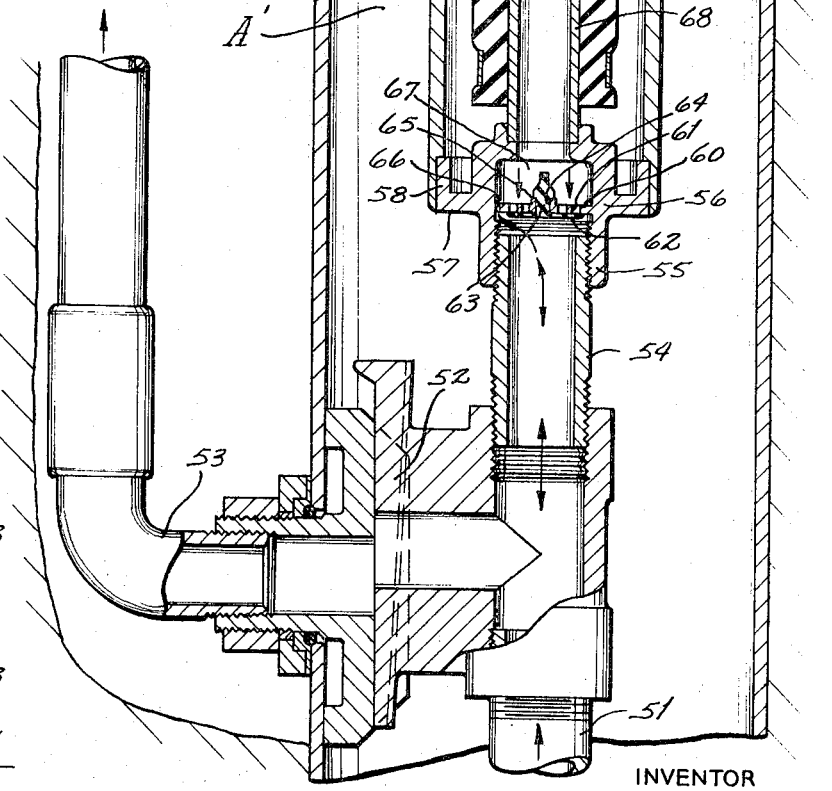
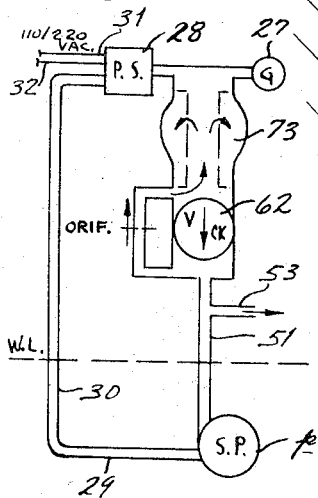
FIG. 5
INVENTOR
ANTHONY V. WEBER
BY Ralph W. Kalish
ATTORNEY

United States Patent Office

3,563,671
Patented Feb. 16, 1971

3,563,671
PUMP CONTROL
Anthony V. Weber, St. Louis County, Mo., assignor to Weber Industries, Inc., St. Louis, Mo., a corporation of Missouri
Filed Oct. 1, 1969, Ser. No. 862,711
Int. Cl. F04b 49/02, 49/06, 49/08
U.S. Cl. 417—38      9 Claims

ABSTRACT OF THE DISCLOSURE

A pump control adapted for use within a pump system having an outlet pipe and with said control being connected to said outlet pipe. Said control comprises an expansible pressure chamber in communication with said pump outlet pipe through a by-pass; there being a valve disposed across the normally direct flow path between said outlet pump and said pressure chamber and being subjected to the pressure differential. A pressure switch as of the diaphragm type is presented for response to pressure within said pressure chamber and connected to said pump for de-energizing same upon the attainment of a predetermined pressure within said pressure chamber.

BACKGROUND AND SUMMARY OF THE INVENTION

This invention relates in general to pump systems and, more particularly, to a pump control for utilization therewith.

Heretofore, in order to maintain appropriate pressure, liquid pumping systems have incorporated a pressure tank for retaining a supply of liquid under air pressure; the pump being energized or de-energized responsively to the liquid level within the tank. Thus, upon opening of a discharge outlet the water level will drop and the pump become energized so that rapid cycling was brought about with attendant depreciation of the pump life.

It is an object of the present invention to provide a pump control which obviates the necessity of incorporating a pressure tank and which is adapted to maintain a constant line pressure in order to effect provision of the liquid to a user at the desired pressure.

It is another object of the present invention to provide a pump control of relatively small volume, being compact in construction and which eliminates air charging devices as heretofore used in conjunction with pressure tanks.

It is another object of the present invention to provide a pump control of the type stated which is adapted to effect de-energization of the pump at a predetermined pressure so as to avoid undesired pressure build-up in the system as well as to conserve the pump by reducing motor failure commonly caused by fast cycling.

It is another object of the present invention to provide a pump control of the character stated which is designed for automatic operation and, thus, avoids the interposition of human services so that the desired results are obtained without concern on the part of the pump user.

It is a still further object of the present invention to provide a pump control which may be readily installed for use with existing pump systems.

It is another object of the present invention to provide a pump control of the type stated which embodies a marked simplicity of parts with the same being of relatively non-complex character so as to conduce to efficient, long term usage without requiring servicing.

It is another object of the present invention to provide a pump control of the type stated, the use of which brings about an evenness of pressure so that the variations in flow resulting from concurrent opening of multiple outlets as heretofore encountered is eliminated.

It is another object of the present invention to provide a pump control for use within pump systems which is durable and reliable in usage and which may be most economically manufactured.

BRIEF DESCRIPTION OF THE DRAWINGS

FIG. 1 is an elevational view of a pump control constructed in accordance with and embodying the present invention.

FIG. 2 is a vertical longitudinal sectional view taken on the line 2—2 of FIG. 1.

FIG. 3 is a schematic diagram of the pump control in association with a submersible pump.

FIG. 4 is a vertical longitudinal sectional view of another form of pump control constructed in accordance with and embodying the present invention.

FIG. 5 is a schematic diagram of the pump control illustrated in FIG. 4 in association with a submersible pump.

DESCRIPTION OF THE PRACTICAL EMBODIMENTS

Referring now by reference characters to the drawings which illustrate practical embodiments of the present invention, and with particular reference to FIGS. 1, 2 and 3, A generally designates a pump control which is useful with any type of pump system but for purposes of illustration herein the same is described for utilization within a submersible pump system comprising the usual pump p (see FIG. 3) located within the customary pump casing (not shown) and having its discharge side connected to the lower end of a riser 1 which, adjacent its upper end, is integral with a discharge pipe 2 which extends laterally from riser 1 and is connected to a vertical pipe (not shown) for delivery of water to an above-ground point. At its upper end riser 1 is externally threaded, as at 3, for threaded engagement within the lower end of a cylindrical casing 4, which latter embodies an internal transverse partition 5 serving to divide the interior of casing 4 into a lower and an upper chamber 6, 7, respectively; the former being of relatively reduced volume. Partition 5 is provided with a central aperture 8 within which is fixed a bushing 9, the lower projecting surface of which constitutes a valve seat 10 for a disc valve 11 carried at the lower end of a valve stem 12. Said stem 12 extends vertically upwardly of valve 11, being substantially coaxial with casing 4 and is slideably received within a guide sleeve 13 secured within a bore 14 formed in a support arm 15 integral with, and extending radially inwardly from, the inner wall of casing 4. Upwardly of arm 15, stem 12 is surrounded by a compression coil spring 16, the lower end of which abuts against the upper end face of sleeve 13 and the upper end of which bears against a detent 17 maintained upon the upper end portion of stem 12 by a nut 18. With reference being made to FIG. 1, it will be seen that spring 16 biases valve 11 upwardly against its seat 10. It will be further observed that valve 11 is in alignment with riser 1 so that liquid moving through the latter will flow directly against said valve 11 whereby the pressure of such liquid will tend to urge said valve into closed condition.

Chambers 6 and 7 of casing 4 are interconnected by a by-pass, indicated generally b, which involves a needle valve body 19 mounted in the side wall of casing 4 for direct communication with chambers 6 and having the customary adjustable spindle or stem 20 for allowing control of the liquid flow therethrough; there being a control handle 21 for convenience of manipulation. Extending upwardly from needle valve body 19 is a flexible conduit 22, the lower end of which is connected by a fitting 23 to said valve body 19 and the upper end of which is engaged to a nipple 24 threadedly secured within the wall of casing 4 for establishing flow connection with upper chamber 7. In its upper portion, chamber 7 is provided with a pair of diametrically opposed openings, as at 25, 25', for receiving fittings 26, 26', respectively, for connection to a pressure gauge 27 and a pressure switch 28, respectively. Said pressure gauge 27 is of the conventional type being calibrated, as in pounds per square inch, for the usual indicating purposes, while pressure switch 28 is also of customary character, being preferably of the diaphragm type and being in circuit, as by leads 29, 30, with pump $p$, for controlling the operation of the latter; and also being connected by conductors 31, 32, to a convenient source of power.

At its upper end casing 4 is provided with an internally threaded opening 33 for engaging the lower end of a short pipe 34 which latter projects vertically upwardly for connection to a flexible accumulator or pressure member 35; opening into the lower end of the latter which is otherwise closed to establish a pressure chamber 36. Accumulator 35 is encased within a cylindrical metallic housing 37 having a side wall 38, a removable top closure 39, and an integral base wall 40 carrying a central aperture 41 through which pipe 34 extends. Disposed upon the inner face of base wall 40 is an adaptor 42 carrying a central internally threaded boss 43 for securement to the received end of pipe 34 and having an upwardly and thence downwardly turned marginal flange 44 for interconnection with the lower end margin of accumulator 35 for securing same in a leak-proof condition.

In order to effectively bring about operation of pump control A, the same must be preset in relation to the maximum pressure developed by the related pump and such presetting is effected as follows: With pressure switch 28 closed and with pump $p$ operating, and with all outlets, such as faucets, taps, and the like, within the particular household closed, pump control A is subjected to the maximum discharge pressure developed by said pump $p$ so that water will flow through by-pass $b$ and into chamber 7 and thence through pipe 34 into accumulator 35 whereby pressure gauge 27 will indicate the pressure being developed within such volumes and it being recognized that when the pressure therein exceeds the pump discharge pressure the valve 11 will be forced away from its seat. Accordingly, the maximum discharge pressure can be readily determined. After such determination, the pressure switch is adjusted so as to open at a pressure of a predetermined value below the maximum pump discharge pressure, say in the order of 10 pounds below such maximum. It may also be predetermined by manipulation of spindle 20 of needle valve 19 to determine the periods of time, at different settings, requisite for a sufficient volume of water to be received within accumulator 35 so as to create a pressure in excess of that acting against the under face of valve 11 to bring about opening of the latter. It will be appreciated that the properties of the material constituting accumulator 35 may be predetermined so as to regulate the degree of expansion thereof under operating conditions.

Thus, with pump control A preset in the manner above described, the operation is as follows: With all liquid outlets closed, and pump $p$ operating, and accumulator 35 in unstressed condition, the maximum pressure will, of course, be within the lines and impinging against valve 11. Water will be moving through by-pass $b$ into accumulator 35 at a rate commensurate with the particular setting of spindle 20. As a member of the household opens one or more taps or faucets, or the like, the pressure will obviously be reduced and as the pressure within accumulator 35 exceeds the current line pressure, said valve 11 will automatically open releasing some of the accumulated water thereby reducing the pressure within said accumulator 34 so that valve 11 will be returned to closed condition under the then existing line pressure. It is to be recognized, however, that the amount of liquid discharged through opening of valve 11 is relatively small and, thus, does not constitute any significant enhancement of the water being supplied. Thus, the pressure switch 28 will be maintained in a closed, pump-operated state as long as the pressure within accumulator 35 is below that at which the switch opens. Through the utilization of a multiplicity of outlets, it is quite conceivable that the pressure within accumulator 35 will exceed that in the line so as to allow opening of the valve 11, but yet not be of sufficient value so as to bring about an opening of switch 28.

However, it is apparent that when the pressure within accumulator 35 reaches or exceeds the pressure at which switch 28 will open, the latter will be caused to open and thereby effect a de-energization of pump $p$. With the particular settings involved, switch-opening would occur most likely when the liquid outlets are closed and pump $p$ is operating to create a maximum pressure within the line. Thus, switch 28 assures that the operation of pump $p$ will be properly controlled. With switch 28 open and pump $p$ thereby arrested in its operation, no further development of pressure will occur within the main line and by reason of the flow of water into accumulator 35 a relatively greater pressure will develop therein so as to cause an opening of valve 11 thereby relieving the pressure within accumulator 35 so that upon such reduction, switch 28 may be returned to closed condition for reinstituting pump operation.

In view of the foregoing, it will be seen that pump control A serves to control the pressure of the system, assuring of proper flow to the various outlets serviced by pump $p$, while simultaneously enhancing the effective life of pump $p$. It is believed that the schematic diagram set forth in FIG. 3 will become readily comprehended Referring now to FIGS. 4 and 5, A' designates another form of pump control embodying the present invention adapted for use with a conventional submersible pump $p$ (FIG. 5) disposed within the lower end of a conventional well casing 50. Pump $p$ is provided with an upwardly extending outlet pipe 51 for connection to a pitless adaptor 52 for establishing communication with a discharge pipe 53 located outwardly of casing 50. Said pitless adaptor 52 is of the well known type for effecting communication of conduits through the well casing wall. Also engaged to pitless adaptor 52 in axially aligned relationship to outlet pipe 51 is a short riser 54 being externally threaded at its upper end for securement with the internal threads of a collar 55 provided on a valve body 56, which latter is integral with a radially extending, circumferentially plate-like portion 57 with an upstanding flange 58 for securement to the lower end of a cylindrical casing 59 for effectively closing the lower end of said latter. Valve body 56 is provided with a transversely extending partition 60 disposed effectively across the upper end of riser 54. Said partition 60 has formed therein a multiplicity of perforations or openings, as at 61, which are occludable by a disc valve 62 presented beneath partition 60 and having a relatively short, upwardly extending stem 63 which projects through an aperture 64 in said partition 60, which stem 63, upwardly of partition 60, is circumferentially increased to present a downwardly directed shoulder 65 of greater diameter than opening 64 so as to limit the downward movement of stem 63 upon opening of valve 62.

Formed also in partition 60 at one side thereof is a port 66 which is beyond the extent of valve 62, being radially outwardly of the adjacent edge thereof, so that said port 66 is at all times open and, for purposes presently appearing, constitutes a by-pass whereby liquid may flow from riser 54 into a chamber 67 provided in the upper portion of valve body 56. The upper wall of chamber 67 contains an opening which receives the lower end of a pipe 68 being coaxial with riser 54 and projecting upwardly within casing 59 for securement to the lower end of a manifold 69 being of such dimension and having a peripheral flange 70 for leak-proof engaging the upper end of casing 59 to constitute the closure for the upper end thereof. Manifold 69 is provided in its upper wall, which may abut the proximate end face of casing 50, with a tapped opening 71 for engaging one end of a T-fitting 72, which latter projects through the proximate wall of casing 50 and is suitably connected to a pressure gauge 27 and a pressure switch 28, the latter being functionally and structurally identical with the gauge and switch described hereinabove in conjunction with pump control A. It will thus be seen that fluid will move through riser 54, by-pass 66, chamber 67, pipe 68, manifold 69, and thence through T-fitting 72 for impingement upon gauge 67 and pressure switch 28.

Within casing 69, pipe 68, throughout the major portion of its length is surrounded by a flexible accumulator 73 which is of general sleeve character being snugly engaged adjacent its ends, as by metal clamping bands 74, to establish a leak-proof joint with the exterior of pipe 68. Drilled or otherwise formed within pipe 68 in the portion thereof encircled by accumulator 73 is a plurality of vertically and circumferentially spaced-apart openings 75 whereby fluid may flow through same for exerting a pressure against accumulator 73 under which the latter will "bulge" or expand, to develop a liquid-receiving pressure chamber. It is, of course, apparent that the properties of accumulator 73 have been predetermined with respect to the requirements of the system in which pump control A' is utilized, as well as the diametral extent of casing 59.

Pump control A' operates in the same manner as pump control A hereinabove described, with the primary exception that by-pass 66 is of fixed character as contradistinguished from the flow-controllable needle valve 19 of pump control A above described. Thus, at the risk of repetition, it will be seen that accumulator 73 will expand as pressure develops therein through the by-passed liquid and will be relieved or returned to normal condition when the pressure therein exceeds that of the line pressure so that valve 62 will open and allow water release. The arrangement of pump control A with a sleeve-type accumulator as differentiated from the general bag-like accumulator 35 of pump control A will render the present invention adaptable for certain types of pump installations and thus enhance the versatility of the present invention.

As indicated hereinabove, pump control A is readily usable with all types of pumping systems but was described with a submersible pump by reason of its extreme suitability therefor. It is to be especially recognized, however, that the flexible accumulators of the present invention are not intended or designed to serve as auxiliary liquid reservoirs, that is, the same are not constructed to hold liquid under pressure for utilization during certain time junctures.

Having described my invention, what I claim and desire to obtain by Letters Patent is:

1. For use in a liquid pumping system having a pump and a discharge pipe connected to said pump, a pump control comprising a valve body, said valve body being connected to said discharge pipe for communication therewith and being coaxial therewith, valve means provided in said valve body within the path of communication with said discharge pipe, resilient means provided on the side of said valve means opposite said discharge pipe for urging same into closed condition, a flexible liquid accumulator disposed with its major axis coaxial with said discharge pipe, said accumulator being opened at one end, means effecting communication between said open end of said accumulator and said valve body on the side thereof opposite said discharge pipe, means defining a liquid bypass provided on said valve body for circumventing said valve means, said liquid bypass having an inlet provided in said valve body between said discharge pipe and said valve means and an outlet within said valve body between said valve means and said accumulator, there being a conduit between said inlet and said outlet, and a pressure switch connected to said valve body between said valve means and said accumulator.

2. The invention as defined in claim 1 and further characterized by a flow control element provided in the inlet of said liquid bypass for selectively restricting flow therethrough to permit a predetermined time interval for developing pump controlling pressure in said flexible accumulator.

3. The invention as defined in claim 2 and further characterized wherein said flow control element is a needle valve and wherein the axis of the same is normal to the major axis of said valve body.

4. The invention as defined in claim 1 and further characterized by said resilient means being of predetermined strength whereby upon development of predetermined pressure within said accumulator, said resilient means will be overcome for opening said valve means to allow direct return of liquid from said accumulator to said discharge pipe.

5. The invention as defined in claim 1 and further characterized by said accumulator being of general bag-form and fabricated of resilient material; and means operationally connecting said pressure switch and said pump.

6. For use in a liquid pumping system having a pump and a discharge pipe connected to said pump, a pump control comprising a valve body, conduit-forming means connecting said valve body to said discharge pipe, valve means provided in said valve body for subjection to liquid pressure within said discharge pipe, means defining a tubular member connected to said valve body and extending therefrom opposite said discharge pipe and being coaxially aligned therewith, said tubular member having a plurality of spaced apart openings for liquid flow therethrough, a flexible, resilient liquid accumulator being of sleeve form and disposed surroundingly of said tubular member and being of such length as to extend beyond the zone containing said openings, means for securing said accumulator at its ends in leak-proof relationship upon said tubular member so that the intervening portion may be flexed or expanded under pressure of liquid passing through said tubular member openings, a switch operable responsive to liquid pressure within said tubular member, means connecting said pressure switch and said tubular member at the end of the latter remote from said valve body, means operatively connecting said pressure switch and said pump, said valve means comprising a flat valve disc having a relatively short stem extending normally from the plane of said disc from the side thereof remote the discharge pipe, and a partition member provided within said valve body having a plurality of perforations formed therein and, means slidably engaging said valve stem to said partition.

7. In a liquid pumping system of the type having a well casing, a pump disposed within said well casing, an outlet pipe connected to said pump, a discharge pipe having an inlet connected to said outlet pipe and extending through said well casing for communication with the exterior, the improvement comprising: A pump control having a valve body within said well casing, conduit-forming means connecting said valve body to said outlet pipe for locating said valve body spacedly from said discharge pipe, valve means provided in said valve body for subjection to liquid pressure within said outlet pipe, means defining a tubular member connected to said valve body and extending therefrom opposite said outlet pipe and being coaxial aligned therewith, said tubular member having a plurality of spaced-apart openings for liquid flow therethrough, a flexible, resilient liquid accumulator being of sleeve form and disposed surroundingly of said tubular member and being of such length as to extend beyond the zone containing said openings, means for securing said accumulator at its ends in leak-proof relationship upon said tubular member so that the intervening portion may be flexed or expanded under pressure of liquid passing through said tubular member openings, said outlet pipe, conduit forming means, and said tubular member being normally filled with liquid, a switch operable responsive to an increase in liquid pressure within said tubular member, means connecting said pressure switch and said tubular member at the end of the latter remote from said valve body, means operatively connecting said pressure switch and said pump, and a liquid bypass communicating said conduit forming means with said tubular member.

8. The improvement as defined in claim 7 and further characterized by a partition provided within said valve body and having a plurality of perforations therein, said valve means comprising a flat valve disc having a relatively short stem extending normally from the plane of said disc from the side thereof remote the outlet pipe, means slidably engaging said valve stem to said partition.

9. The invention as defined in claim 8 and further characterized by said valve means being urged into sealing engagement with said perforations under pressure of liquid within said outlet pipe and said conduit forming means, said valve disc having a diameter less than the diameter of said partition, said liquid bypass constituting a restricted passage located in said partition spacedly beyond the extent of said valve disc.

References Cited

UNITED STATES PATENTS

| | | | |
|---|---|---|---|
| Re. 20,887 | 10/1938 | Mercier | 138—30 |
| 3,067,302 | 12/1962 | Nielsen | 103—25 |
| 3,370,544 | 2/1968 | Thorpe | 103—223 |
| 3,394,733 | 7/1968 | Jacuzzi | 103—223 |
| 3,457,864 | 7/1969 | Price | 103—25 |

FOREIGN PATENTS

| | | | |
|---|---|---|---|
| 301,145 | 10/1917 | Germany | 103—25 |

WILLIAM L. FREEH, Primary Examiner

J. J. VRABLIK, Assistant Examiner

U.S. Cl. X.R.

417—44